United States Patent
Sorin et al.

(12)

(10) Patent No.: US 6,256,103 B1
(45) Date of Patent: Jul. 3, 2001

(54) SYSTEM AND METHOD FOR OPTICAL HETERODYNE DETECTION OF AN OPTICAL SIGNAL

(75) Inventors: Wayne V. Sorin, Mountain View; Douglas M. Baney, Los Altos, both of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/506,195

(22) Filed: Feb. 17, 2000

(51) Int. Cl.$^7$ .................................................. G01B 9/02

(52) U.S. Cl. ................................. 356/484; 359/192

(58) Field of Search .......................... 356/484; 359/191, 359/192

(56) References Cited

U.S. PATENT DOCUMENTS

| | | | |
|---|---|---|---|
| 4,856,899 | 8/1989 | Iwaoka et al. | 356/346 |
| 5,365,335 | 11/1994 | Sorin | 356/345 |
| 5,457,563 | * 10/1995 | Van Deventer | 359/191 |
| 5,872,624 | * 2/1999 | Chambers et al. | 356/73.1 |
| 5,953,139 | * 9/1999 | Nemecek et al. | 359/124 |

* cited by examiner

Primary Examiner—Frank G. Font
Assistant Examiner—Phil Natividad

(57) ABSTRACT

A system for monitoring an optical signal includes an optical heterodyne detection system in which an input signal and a swept local oscillator signal are combined to generate a combined optical signal. At least two beams of the combined optical signal are filtered by a filter that passes a wavelength band which tracks the wavelength of the swept local oscillator signal. As the local oscillator signal sweeps across a wavelength range, filtering of the beams is adjusted to track the wavelength of the local oscillator signal. Filtering the beams to pass a wavelength band corresponding to the wavelength of the swept local oscillator signal reduces the intensity noise contributed from light sources having wavelengths that are not near the wavelength of the local oscillator signal. Another system for monitoring an optical signal includes an optical heterodyne detection system in which the intensity noise of the input signal and/or the intensity noise of the swept local oscillator signal is reduced before the input signal and the local oscillator signal are combined. An embodiment of the optical heterodyne detection system includes an intensity noise reducer for the input signal and/or an intensity noise reducer for the swept local oscillator signal, an optical combining unit, photodetectors, and may include a processor. Utilizing intensity noise reducers for the input signal and/or the local oscillator signal reduces the intensity noise that is detected by the photodetectors and improves the signal to noise ratio of the heterodyne detection system.

22 Claims, 13 Drawing Sheets

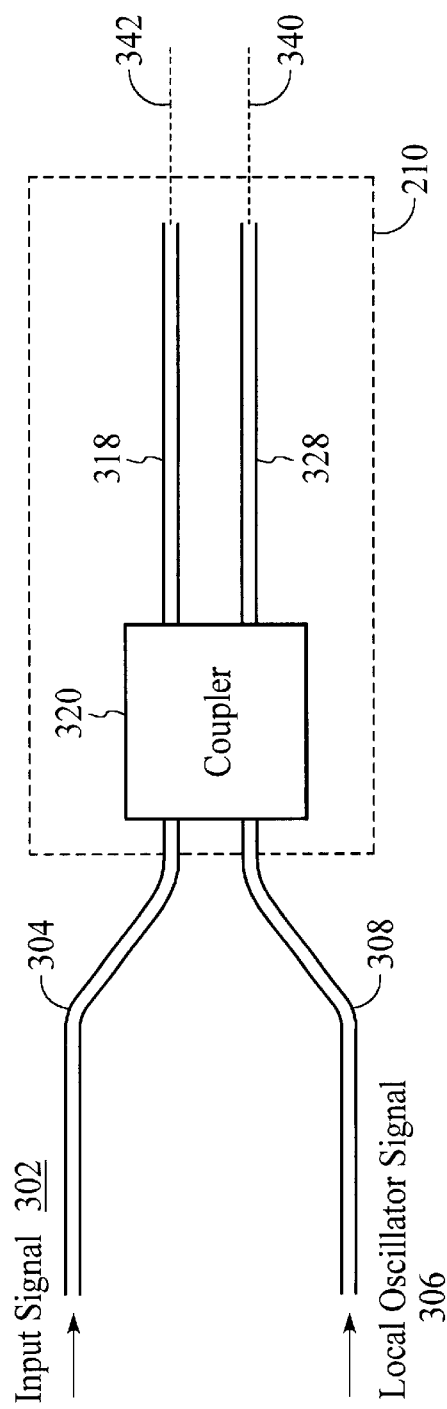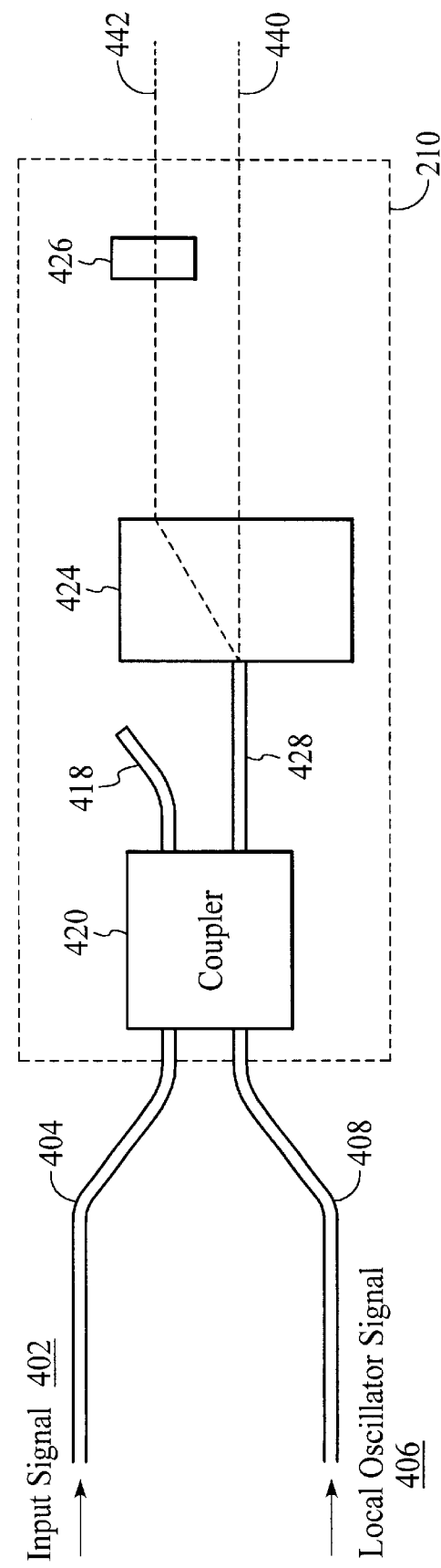

SYSTEM AND METHOD FOR OPTICAL HETERODYNE DETECTION OF AN OPTICAL SIGNAL

FIELD OF THE INVENTION

The invention relates generally to the field to optical measurements and measuring systems, and more particularly to a system and method for optical heterodyne detection of an optical signal.

BACKGROUND OF THE INVENTION

Dense wavelength division multiplexing (DWDM) requires optical spectrum analyzers (OSAs) that have higher spectral resolution than is typically available with current OSAs. For example, grating-based OSAs and autocorrelation-based OSAs encounter mechanical constraints, such as constraints on beam size and the scanning of optical path lengths, which limit the degree of resolution that can be obtained.

As an alternative to grating-based and autocorrelation-based OSAs, optical heterodyne detection systems can be utilized to monitor DWDM systems. FIG. 1 is a depiction of a prior art optical heterodyne detection system. The optical heterodyne detection system includes an input signal 102, an input waveguide 104, a local oscillator signal 106, a local oscillator waveguide 108, an optical coupler 110, an output waveguide 118, a photodetector 112, and a signal processor 116. The principles of operation of optical heterodyne detection systems are well known in the field of optical heterodyne detection and involve monitoring the heterodyne term that is generated when an input signal is combined with a local oscillator signal. The heterodyne term coexists with other direct detection signals, such as intensity noise from the input signal and intensity noise from the local oscillator signal.

Optical heterodyne detection systems are not limited by the mechanical constraints that limit the grating based and autocorrelation based OSAs. The spectral resolution of an optical heterodyne system is limited by the linewidth of the local oscillator signal, which can be several orders of magnitude narrower than the resolution of other OSAs.

In order to improve the performance of optical heterodyne detection systems with regard to parameters such as sensitivity and dynamic range, it is best for the heterodyne signal to have a high signal to noise ratio. However, the signal to noise ratio of the heterodyne signal is often degraded by noise that is contributed by the direct detection signals, especially in the case where the input signal includes multiple carrier wavelengths. One technique for improving the signal to noise ratio of the heterodyne signal, as described in U.S. Pat. No. 4,856,899, involves amplifying the input signal before the input signal is combined with the local oscillator signal in order to increase the amplitude of the heterodyne signal. Although amplifying the input signal increases the amplitude of the heterodyne signal, the amplification also increases the intensity noise of the input signal and may not improve the signal to noise ratio of the heterodyne signal.

It is also important in optical heterodyne detection that the polarization of the input signal and the local oscillator signal are matched. In order to match the polarization of the local oscillator signal to the polarization of the input signal, the polarization state of the local oscillator signal may be controlled by a polarization controller 120 as indicated by the two loops in the heterodyne detection system of FIG. 1. A disadvantage of the optical heterodyne detection system of FIG. 1 is that detection of the input signal is highly dependent on the polarization of the input signal.

A polarization diversity receiver can be incorporated into an optical heterodyne detection system to provide polarization independent signal detection. Although a polarization diversity receiver provides polarization independent signal detection, the polarization diversity receiver does not provide a way to separate the intensity noise from the heterodyne signal. In order to improve the performance of heterodyne detection systems, it is necessary to be able to clearly distinguish the heterodyne signal from the intensity noise.

In view of the prior art limitations in optical heterodyne detection systems, what is needed is an optical heterodyne detection system that generates a heterodyne signal with an improved signal to noise ratio.

SUMMARY OF THE INVENTION

A system for monitoring an optical signal includes an optical heterodyne detection system in which the intensity noise of the input signal and/or the intensity noise of the swept local oscillator signal is reduced before the input signal and the swept local oscillator signal are combined. An embodiment of the optical heterodyne detection system includes an intensity noise reducer for the input signal and/or an intensity noise reducer for the swept local oscillator signal, an optical coupling unit, at least two photodetectors, and may include a processor. Utilizing intensity noise reducers for the input signal and/or the swept local oscillator signal reduces the intensity noise that is detected by the photodetectors and improves the signal to noise ratio and the dynamic range of the heterodyne detection system. Optical intensity noise reduction can be accomplished utilizing various techniques and the particular technique utilized is not critical.

An embodiment of an optical heterodyne detection system includes an optical amplifier for amplifying the swept local oscillator signal. The optical amplifier increases the power of the local oscillator signal, thereby improving the signal to noise ratio and dynamic range of the heterodyne detection system. The intensity noise reducer for the local oscillator signal is preferably utilized when the optical amplifier is utilized in order to control the additional intensity noise that is contributed by the optical amplifier.

Because intensity noise reducers for both the input signal and the swept local oscillator signal may not be required on a single system, an embodiment of the system may include an intensity noise reducer for the input signal and no intensity noise reducer for the swept local oscillator signal. Conversely, an embodiment may include an intensity noise reducer for the swept local oscillator signal and no intensity noise reducer for the input signal.

In an embodiment, the optical heterodyne detection system includes an optical pre-selector connected to the output of the optical combining unit. The optical pre-selector has a passband that tracks the wavelength of the swept local oscillator signal. In an embodiment, the optical combining unit includes an optical coupler for combining the input signal and the swept local oscillator signal and for outputting light beams to corresponding photodetectors. In another embodiment, the optical combining unit includes an optical coupler and a polarizing beam splitter for splitting the combined optical signal into polarized portions that are output to corresponding photodetectors.

A method for monitoring an optical signal utilizing an optical heterodyne detection system involves reducing the intensity noise of the input signal and/or the swept local oscillator signal, combing the input signal and the swept local oscillator signal to generate a combined optical signal, and outputting light beams each including a portion of the combined optical signal, generating electrical signals in response to the light beams, and processing the electrical signals to determine an optical characteristic represented by the input signal.

The method for monitoring an optical signal utilizing optical heterodyne detection may involve additional steps. In one embodiment, the intensity noise of both the input signal and the swept local oscillator signal is reduced before the signals are combined. In an embodiment, the swept local oscillator signal is amplified before it is combined with the input signal. In another embodiment, the light beams are optically filtered before the electrical signals are generated. The optical filtering passes a wavelength band that corresponds to the wavelength of the swept local oscillator signal. The passband of the filtering is adjusted in real-time to track the changing wavelength of the swept local oscillator signal.

In another embodiment, the combined optical signal is split into polarized portions and each of the polarized portions is output as one of the light beams. In another embodiment, the input signal and the swept local oscillator are combined to generate two instances of the combined optical signal. The two instances of the combined optical signal are split into two polarized portions and then the four polarized portions are output as four output beams. First, second, third, and fourth electrical signals are generated in response to the four polarized portions. The first, second, third, and fourth electrical signals are processed to determine an optical characteristic represented by the input signal.

In an embodiment, processing of the four electrical signals involves subtracting the first electrical signal from the third electrical signal in order to suppress intensity noise, thereby creating a first subtracted signal, subtracting the second electrical signal from the fourth electrical signal in order to suppress intensity noise, thereby creating a second subtracted signal, squaring the first subtracted signal, thereby creating a first squared signal, squaring the second subtracted signal, thereby creating a second squared signal, low pass filtering the first and second squared signals, thereby creating first and second filtered signals, and adding the first filtered signal to the second filtered signal in order to achieve polarization independence.

The optical heterodyne detection system and method provide an optical measurement system that is accurate over a wide range of wavelengths. The optical heterodyne detection system and method can be utilized as an optical spectrum analyzer to characterize an unknown input signal. The optical heterodyne detection system and method may also be utilized as an optical network analyzer in which a known signal is input into an optical network and the output signal is measured by the detection system.

Other aspects and advantages of the present invention will become apparent from the following detailed description, taken in conjunction with the accompanying drawings, illustrating by way of example the principles of the invention.

BREIF DESCRIPTION OF THE DRAWINGS

FIG. 3 is an expanded view of the optical combining unit of FIG. 2 that includes two beams output from a coupler in accordance with the invention.

FIG. 4 is an expanded view of the optical combining unit of FIG. 2 that includes one beam output from a coupler and split by a polarizing beam splitter in accordance with the invention.

DETAILED DESCRIPTION OF THE INVENTION

An embodiment of the invention involves an optical heterodyne detection system in which an input signal and a swept local oscillator signal are combined and output as at least two beams. The at least two beams are filtered by a filter that passes a wavelength band that tracks the wavelength of the swept local oscillator signal. As the local oscillator signal sweeps across a wavelength range, filtering of the at least two beams is adjusted to track the wavelength of the local oscillator signal. Filtering the beams to pass a wavelength band corresponding to the wavelength of the swept local oscillator signal reduces the intensity noise contributed from light sources having wavelengths that are not near the wavelength of the local oscillator signal.

Figure 1:
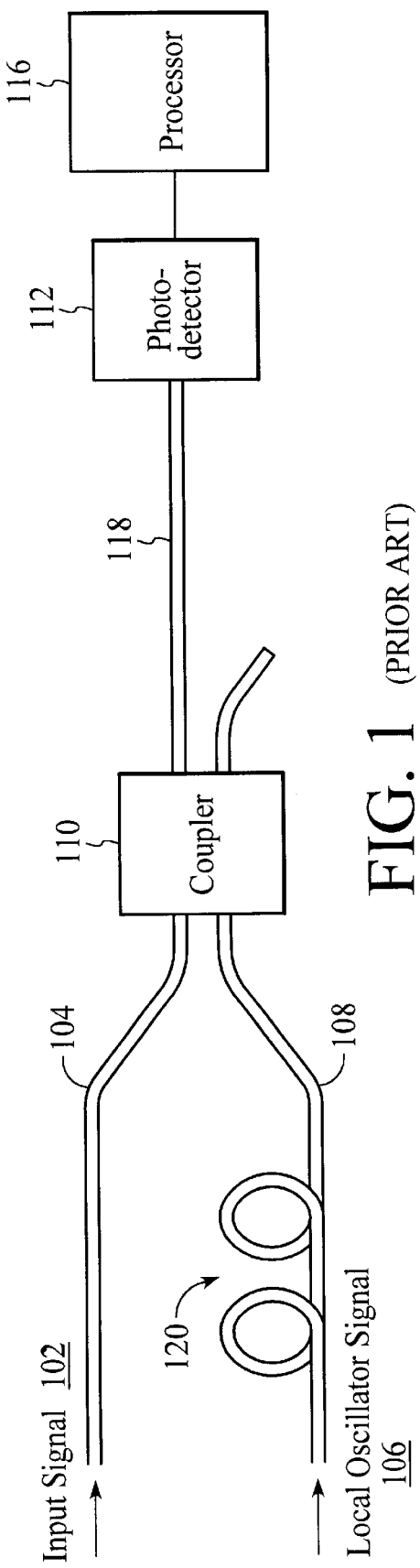
FIG. 1 is a depiction of an optical heterodyne detection system that includes a single photodetector in accordance with the prior art.
Figure 2:
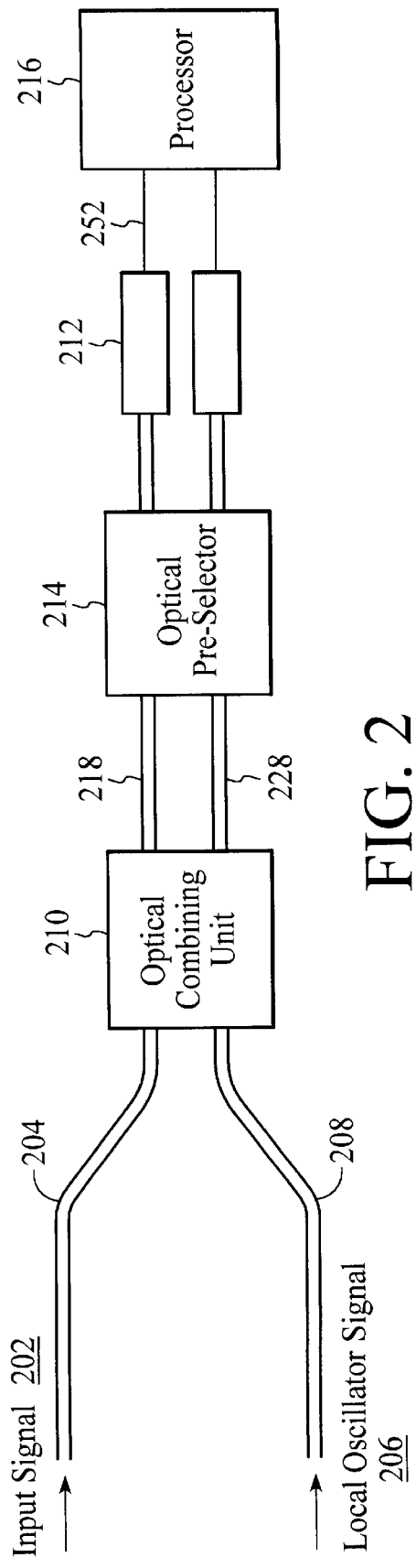
FIG. 2 is a depiction of an optical heterodyne detection system that includes an optical combining unit, an optical pre-selector, and two photodetectors in accordance with the invention.

FIG. 2 depicts an optical heterodyne detection system that includes an input signal 202, a signal fiber 204, a local oscillator signal 206, a local oscillator fiber 208, an optical combining unit 210, an optical pre-selector 214, two photodetectors 212, and a processor 216. It should be noted that throughout the description similar element numbers are utilized to identify similar elements.

The input signal 202 and the local oscillator signal 206 include optical signals that are generated from conventional devices as is known in the field of optical communications systems. For example, the input signal and the local oscillator signal may be generated by lasers. The input signal may consist of a single wavelength or the input signal may include multiple wavelengths as is known in the field of wavelength division multiplexing (WDM). The input signal may be an optical signal having unknown optical characteristics, in which case the optical heterodyne detection system can be utilized for optical spectrum analysis. The input signal may alternatively be a delayed portion of the local oscillator signal that is utilized for optical network analysis. When the monitoring system is being utilized for optical network analysis, the characteristics of a network or a single network component can be determined by inputting a known input signal into the network or the single network component and then measuring the response to the known signal.

Preferably, the local oscillator signal 206 is a widely tunable optical signal generated from a wideband tunable laser. For example, the local oscillator signal may be tunable over a range of one nanometer or greater. During optical spectrum analysis, the local oscillator signal is typically swept across a wavelength range in order to detect the input signal over a range of wavelengths.

The signal fiber 204 carries the input signal 202 that is to be detected by the system. In an embodiment, the signal fiber is a single mode optical fiber as is known in the art, although other optical waveguides may be utilized. In addition, although waveguides are described, optical signals may be input into the system, or transmitted within the system, in free space.

The local oscillator fiber 208 is an optical fiber, such as a single mode optical fiber, that carries the local oscillator signal 206. The local oscillator fiber may include a polarization controller (not shown) that controls the polarization state of the local oscillator signal. Other optical waveguides may be utilized in place of single mode optical fiber, such as polarization preserving fiber. Alternatively, the local oscillator signal may be transmitted through free space without the use of a waveguide.

The optical combining unit 210 optically combines the input signal 202 and the local oscillator signal 206 into a combined optical signal and outputs at least two beams of the combined optical signal. The combined optical signal includes the heterodyne signal and intensity noise from the input signal and from the local oscillator signal. In an embodiment, the input signal and the local oscillator signal are combined in a manner that ensures the spatial overlap of the input signal and the local oscillator signal, thereby allowing full interference between the input signal and the local oscillator signal.

In an embodiment, the optical combining unit includes a coupler that outputs the combined optical signal into two optical paths. In another embodiment, the optical combining unit includes a coupler and a polarizing beam splitter that outputs two polarized portions of the combined optical signal. Although the optical combining unit is described below as outputting two beams of the combined optical signal, it should be understood that embodiments of the optical combining unit that output more than two beams of the combined optical signal are possible.

FIG. 3 is a depiction of an embodiment of the optical combining unit 210 in which the optical combining unit includes an optical coupler 320 that has two outputs represented by two output fibers 318 and 328. As shown in FIG. 3, two portions of the combined optical signal 340 and 342 are output from the two fibers. The two output portions of the combined optical signal are transmitted from the coupler to the optical pre-selector and then to the two corresponding photodetectors. In the embodiment of FIG. 3, the resulting output signal is not independent of the polarization state of the input signal. In the embodiment of FIG. 3, the power distribution of the input signal and local oscillator signal between the two output fibers is influenced by the optical coupler and can be controlled to accomplish the desired power distribution. In an embodiment, the power of the combined optical signal is distributed approximately evenly between the two output fibers.

The optical coupler 320 in FIG. 3 may be an optically directional 3 dB fiber coupler, although other optical couplers may be utilized. In an embodiment, the optical coupler is substantially independent of the polarization of optical signals. In an embodiment, the optical coupler does not polarize the combined optical signal.

FIG. 4 is a depiction of an embodiment of the optical combining unit 210 in which the optical combining unit includes an optical coupler 420, a polarizing beam splitter 424, and a half-wave plate 426. The optical coupler combines the input signal 402 and the local oscillator signal 406 onto at least one waveguide. As shown in FIG. 4, the optical coupler combines the input signal and the local oscillator signal and outputs the combined optical signal into output fiber 428. It should be noted that although output fiber 418 is shown, there may not be two outputs from the coupler 420. In an embodiment, the length of the output fiber 428 is chosen to provide sufficient attenuation of any cladding modes before the light of the input signal or the local oscillator signal reaches the end of the output fiber. For example, the length of the output fiber should be chosen such that cladding mode light accounts for less than one percent of the total light emitted from the output fiber.

The polarizing beam splitter 424 separates an incoming optical beam into two polarized beams so that an output signal that is independent of the polarization state of the input signal can be generated. The polarizing beam splitter may include, for example, a birefringent crystal that provides polarization walk-off, such as a rutile walk-off crystal. As will be described below, the polarizing beam splitter separates the combined optical signal beam into two beams having different polarization states. Preferably, the polarizing beam splitter separates the incoming beam into two linearly polarized components that have orthogonal directions of polarization. In an embodiment, the polarization of the local oscillator signal is controlled such that the power contributed from the local oscillator signal is split approximately evenly by the polarizing beam splitter. Although the optical coupler 420 and the polarizing beam splitter are shown as physically separate devices connected by optical fiber 428, the optical coupler and polarizing beam splitter may be integrated into a planar waveguide circuit that does not require optical fiber connections. It should be understood that other polarizing beam splitters may be utilized.

FIG. 4 shows how the beam of the combined optical signal carried on output fiber 428 is split into two differently polarized beams, as identified by the dashed lines 440 and 442. As shown in FIG. 4, the straight line beam 440 follows an "ordinary" path and is referred to as the ordinary beam. The diagonal line beam 442 walks off in an "extraordinary" path and is referred to as the extraordinary beam.

In a preferred embodiment, the two polarized beams 440 and 442 have the same polarization state before the beams enter the optical pre-selector. In order to make the two beams have the same polarization state, the polarization state of the extraordinary beam 442 is rotated to match the polarization state of the ordinary beam 440. When the two beams have orthogonal polarization, the extraordinary beam is rotated by 90 degrees. In an embodiment, a half-wave plate 426 is utilized to accomplish the 90-degree rotation. Although FIG. 4 represents one arrangement for generating two beams with the same polarization state, other arrangements may alternatively be utilized within the optical combining unit 210 as would be apparent to one of ordinary skill in the field of optical communications systems.

Whether the optical combining unit involves the embodiment of FIG. 3 or the embodiment of FIG. 4, the end result is that two beams are output from the optical combining unit to the optical pre-selector. Referring back to FIG. 2, the optical pre-selector 214 is a tunable bandpass filter that is tuned to track the swept local oscillator signal 206. That is, the optical pre-selector is tuned so that the optical pre-selector has the highest optical transmission over a wavelength band that corresponds to the wavelength of the swept local oscillator signal. In an embodiment, the optical pre-selector is located between the optical combining unit 210 and the two photodetectors 212.

Figure 5:
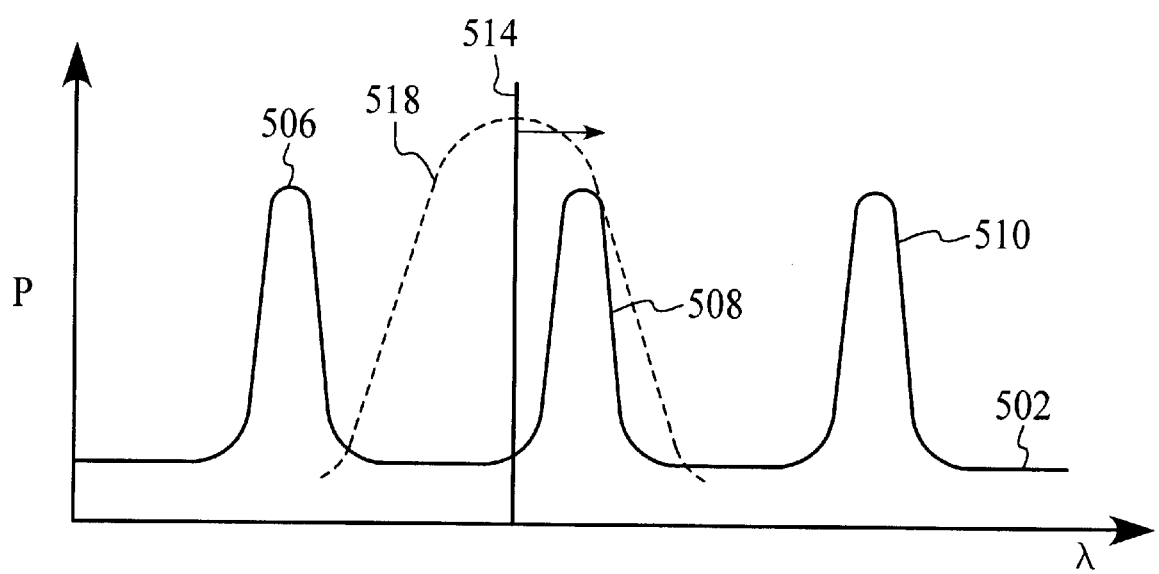
FIG. 5 is a graph of an unfiltered input signal and a swept local oscillator signal in relation to the passband of an optical pre-selector that tracks the swept local oscillator signal.
Figure 6:
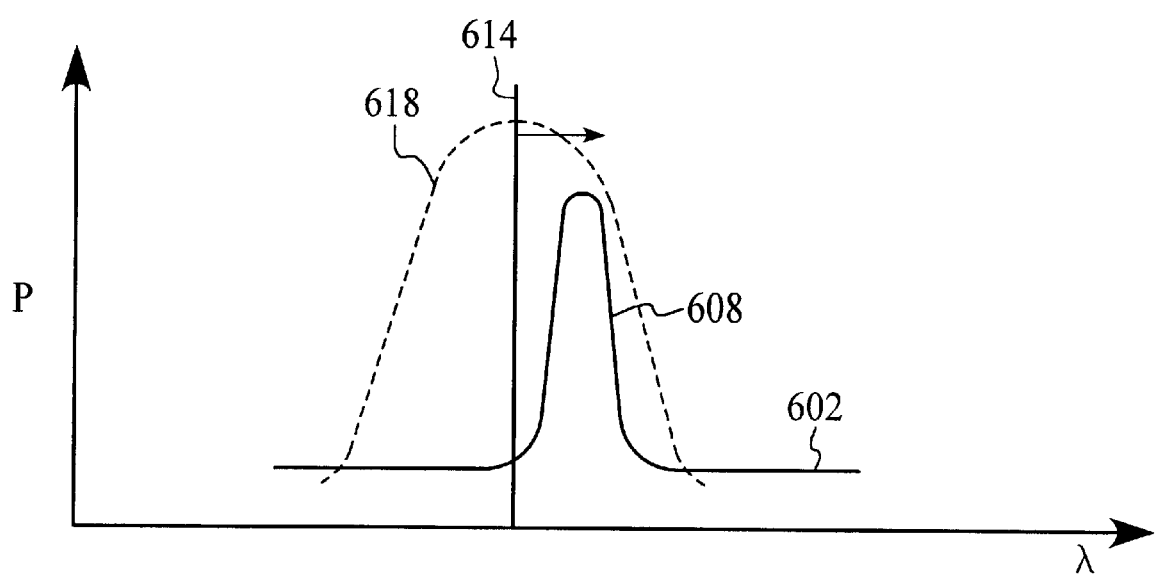
FIG. 6 is a graph of a filtered input signal and a swept local oscillator signal in relation to the passband of an optical pre-selector that tracks the swept local oscillator.

Operation of the optical pre-selector 214 in a WDM system is depicted in the signal power vs. wavelength graphs of FIGS. 5 and 6. FIG. 5 depicts an input signal 502 as three optical carriers 506, 508, and 510 in a WDM system in relation to a swept local oscillator signal 514 before the combined input signal and swept local oscillator signal have entered the optical pre-selector. For example purposes, the dashed line 518 represents the passband of the optical pre-selector that is tuned to track the sweep of the local oscillator signals. Optical signals within the passband continue to be transmitted and optical signals outside of the passband are filtered by the optical pre-selector.

FIG. 6 depicts the one optical carrier 608 that exits the optical pre-selector after the optical signals have been filtered. As shown by FIG. 6, the optical pre-selector filters out optical carriers that are not near the wavelength of the swept local oscillator signal 614 (i.e., outside the passband of the optical pre-selector). The optical carriers that are not near the wavelength of the swept local oscillator signal are not necessary for optical heterodyne detection and only contribute to noise in the detection system if not filtered. Optical bandpass filtering that tracks the wavelength of the swept local oscillator signal is especially useful when measuring broadband optical noise, such as amplified spontaneous emissions from an optical amplifier.

Tunable optical pre-selectors, such as those described with reference to FIGS. 2, 5, and 6 are well known in the field of optical communications and can be implemented utilizing components such as diffraction gratings, dielectric interference filters, Fabry-Perot interferometers, and other known interferometers. The embodiment of FIG. 2 has the optical pre-selector 214 located between the optical combining unit 210 and the photodetectors 212 because the polarization states of the beams can be directly controlled to provide beams with known polarization states. Reliable bandpass filtering techniques can be utilized to filter beams having known polarization states. Although the arrangement of FIG. 2 is preferred, the optical pre-selector can be placed in other locations, such a location along the optical path of the swept local oscillator signal that is before the optical combining unit, a location along the optical path of the input signal that is before the optical combining unit, or both locations.

Referring to FIG. 2, the two photodetectors 212 are aligned to separately detect the two filtered beams that are output from the optical pre-selector 214. The two photodetectors generate electrical signals in response to a corresponding one of the two filtered beams. The electrical signals generated by each of the two photodetectors are individually provided to the processor 216. The two connections between the photodetectors and the processor are depicted in FIG. 2 by two lines 252. Although the two photodetectors are depicted as two independent photodetectors, the two photodetectors may be combined into a single unit Although not shown, the photodetectors may include additional circuitry such as signal amplifiers and filters, as is known in the field.

The processor 216 receives the electrical signals from the two photodetectors 212 and processes the electrical signals into useful data. The processor may include analog signal processing circuitry and/or digital signal processing circuitry as is known in the field of electrical signal processing. In an embodiment, analog signals from the photodetectors are converted into digital signals and the digital signals are subsequently processed. It should be understood that digital signal processing involves converting the electrical signals from the photodetectors into digital signals that are representative of the original electrical signals.

Operation of the optical heterodyne detection system described with reference to FIGS. 2 and 3 involves combining an input signal and a swept local oscillator signal into a combined optical signal and outputting two beams of the combined optical signal to the optical pre-selector 214. The two beams are then filtered by the optical pre-selector 214. The optical pre-selector passes a wavelength band that tracks the swept local oscillator signal. The two filtered beams are then detected by the two photodetectors 212. The two photodetectors generate electrical signals in proportion to the intensity of the optical beams that are detected. The electrical signals generated by the two photodetectors are then received by the processor 216 and processed in a manner that maximizes the signal to noise ratio of the heterodyne term of the combined optical signal. Processing of the electrical signals may involve providing intensity noise suppression. Preferably, during operation, the center wavelength of the optical pre-selector passband tracks, in real-time, the wavelength of the swept local oscillator signal. As is described below, the system may require an initial calibration operation in order to provide accurate results.

Operation of the optical heterodyne detection system described with reference to FIGS. 2 and 4 involves combining an input signal and a swept local oscillator signal into a combined optical signal, outputting one beam from the optical coupler, and then splitting the beam that is output from the optical coupler into two polarized beams. As described above, the combined optical signal that is output from the optical coupler is split into two polarized beams having different polarization states. The polarization state of the extraordinary portion of the split beam is then rotated so that the two polarized beams have the same polarization state. The two beams are then filtered by the optical pre-selector 214. The optical pre-selector passes a wavelength band that tracks the swept local oscillator signal. The two polarized and filtered beams are then detected by the two photodetectors 212. The two photodetectors generate electrical signals in proportion to the intensity of the optical beams that are detected. The electrical signals generated by the two photodetectors are then received by the processor 216 and processed in a manner that maximizes the signal to noise ratio of the heterodyne term of the combined optical signal. Processing of the electrical signals may involve squaring the electrical signals from the two photodetectors and then adding the two squared terms to generate an output signal that is independent of the polarization state of the input signal. Preferably, during operation, the center wavelength of the optical pre-selector passband tracks, in real-time, the wavelength of the swept local oscillator signal.

Whether or not the optical combining unit includes a polarizing beam splitter, the combination of the optical combining unit, the optical pre-selector, and the photodetectors creates an optical heterodyne detection system that filters the optical signals to reduce noise and improve the dynamic range of the system.

Figure 7:
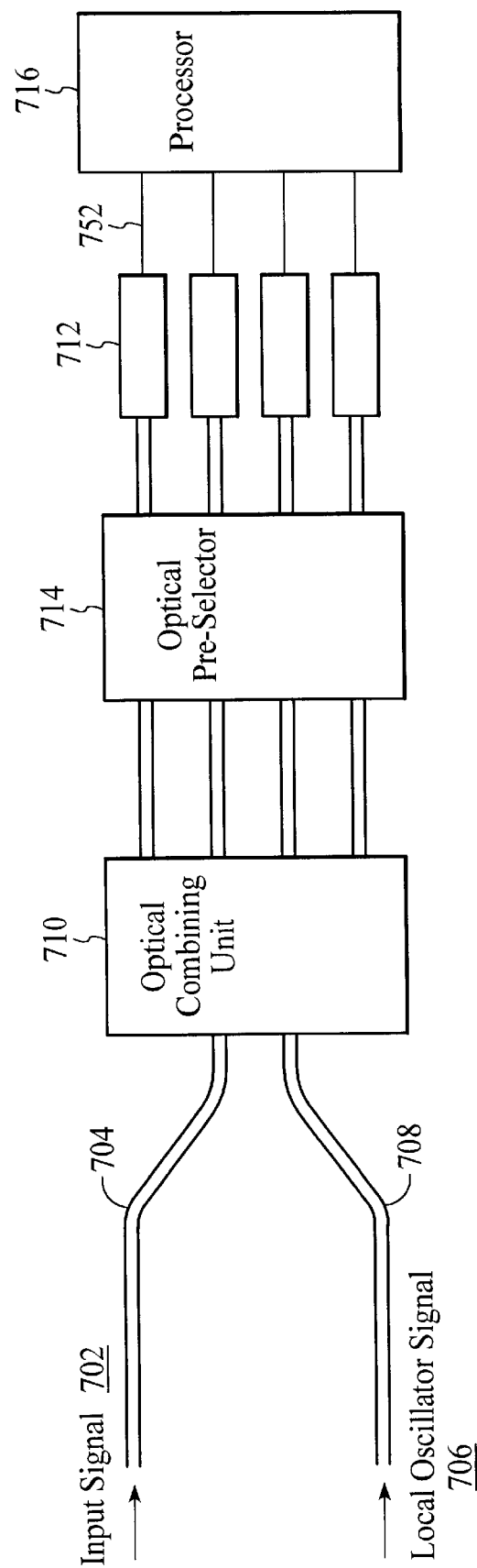
FIG. 7 is a depiction of an optical heterodyne detection system that includes an optical combining unit, an optical pre-selector, and four photodetectors in accordance with the invention.

As described above, the optical heterodyne detection system of FIG. 2 may include more than two beams being output from the optical combining unit 210. FIG. 7 is a depiction of an optical heterodyne detection system that includes four beams being output from the optical combining unit.

Figure 8:
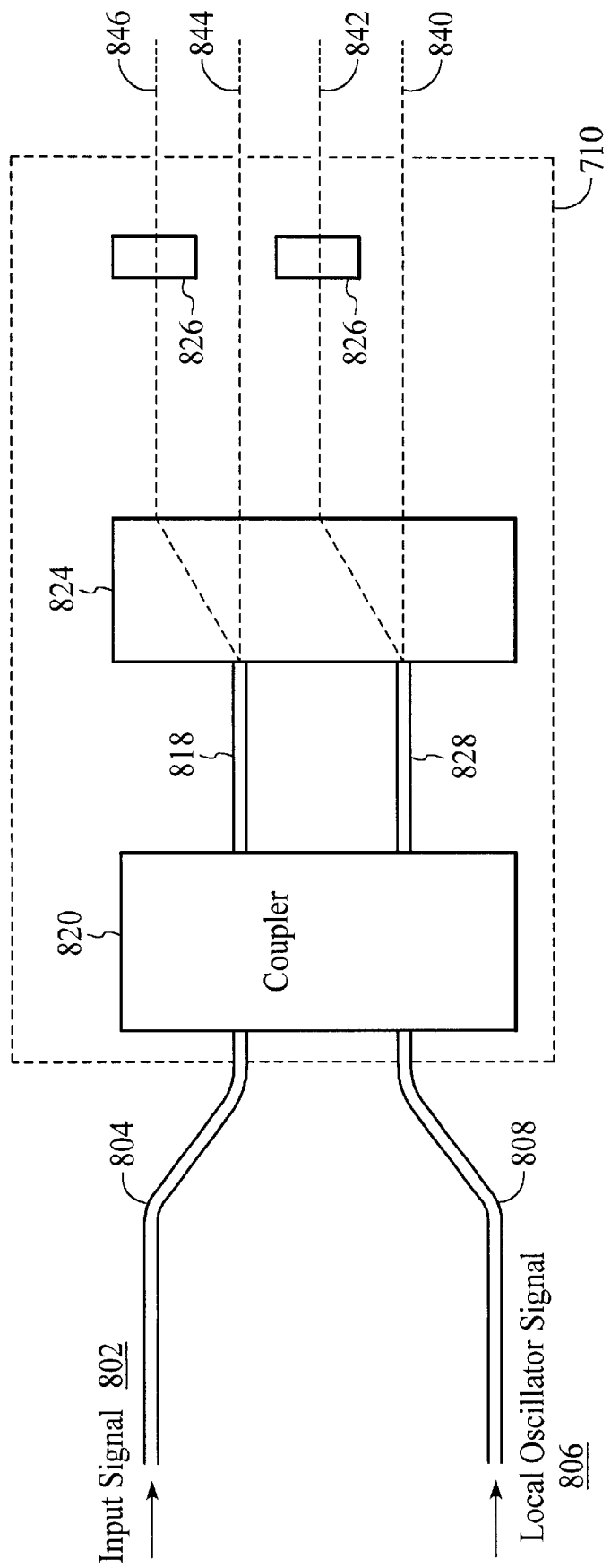
FIG. 8 is an expanded view of the optical combining unit of FIG. 7 that includes two beams output from a coupler and split by a polarizing beam splitter in accordance with the invention.

FIG. 8 is an expanded view of an embodiment of an optical combining unit that outputs four polarized beams. The optical combining unit of FIG. 8 includes an optical coupler 820, two output fibers 818 and 828, a polarizing beam splitter 824, and two half-wave plates 826. As shown in FIG. 8, the optical coupler combines the input signal and the local oscillator signal and distributes the combined optical signal into the two output fibers 818 and 828. The two output fibers carry the combined optical signal to the polarizing beam splitter 824. Preferably, the power of the combined optical signal is distributed approximately evenly between the two output fibers. The optical coupler 820 may be an optically directional 3 dB fiber coupler, although other optical couplers may be utilized. In an embodiment, the optical coupler is substantially independent of the polarization of optical signals. In an embodiment, the optical coupler does not polarize the combined optical signal.

The polarizing beam splitter 824 splits each of the combined optical signal beams from the output fibers 818 and 828 into two beams having different polarization states. Preferably, the polarizing beam splitter splits each of the incoming beams into two linearly polarized components that have orthogonal directions of polarization. In an embodiment, the polarization of the local oscillator signal is controlled such that the power contributed from the local oscillator signal is split approximately evenly by the polarizing beam splitter. Although the polarizing beam splitter is described as a single device, the polarizing beam splitter may include multiple beam splitters in configurations that accomplish the task of splitting the incoming beams based on beam polarization.

FIG. 8 shows how the two beams of the combined optical signal are each split into two differently polarized beams, as identified by the dashed lines 840, 842, 844, and 846. As shown in FIG. 8, the straight line beams 840 and 844 follow an "ordinary" path and are referred to as the ordinary beams. The diagonal line beams 842 and 846 walk off in an "extraordinary" path and are referred to as the extraordinary beams.

In a preferred embodiment, each of the four polarized beams 840, 842, 844, and 846 have the same polarization state before the beams enter the optical pre-selector. In order to make the four beams have the same polarization state, the polarization states of the two extraordinary beams 842 and 846 are rotated to match the polarization state of the two ordinary beams. In an embodiment, two half-wave plates 826 are utilized to accomplish a 90-degree rotation. Although FIG. 8 represents one arrangement for generating four beams with the same polarization state, other arrangements may alternatively be utilized within the optical combining unit 710 as would be apparent to one of ordinary skill in the field of optical communications systems.

Figure 9:
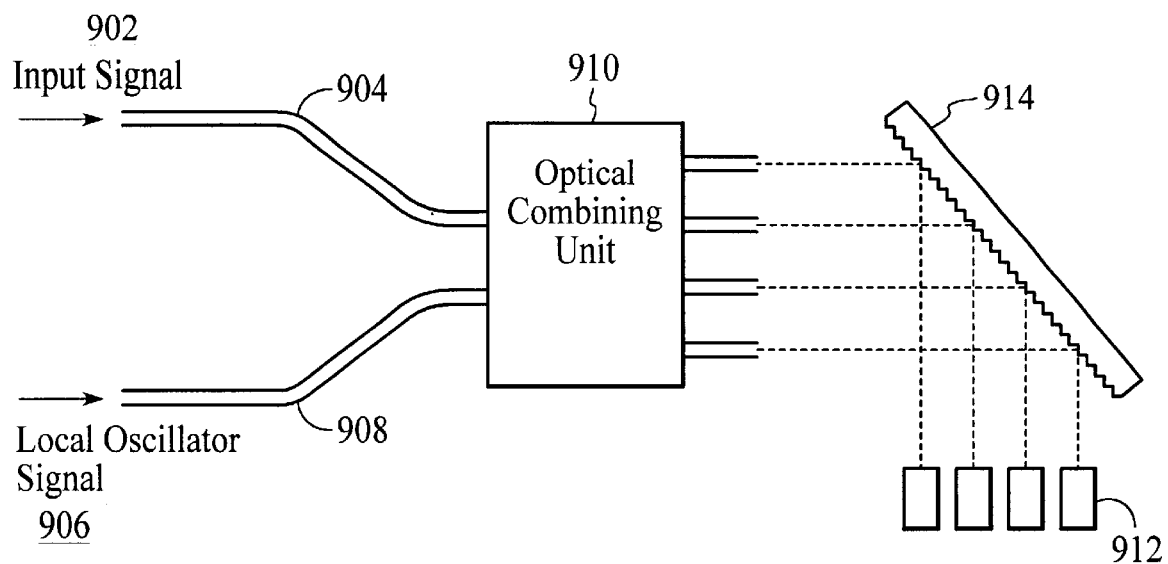
FIG. 9 is a depiction of an example optical pre-selector in relation to the optical combining unit and four photodetectors that is related to the systems depicted in FIGS. 7 and 8 in accordance with the invention.

Referring back to FIG. 7, the optical pre-selector 714 includes a tunable bandpass filter that is tuned to track the swept local oscillator signal 706. An embodiment of an optical pre-selector that includes a tunable diffraction grating is described in detail with reference to FIG. 9. As shown in FIG. 9, four beams having the same polarization state exit the optical combining unit 910 and contact the tunable diffraction grating 914. The tunable diffraction grating is tuned to pass a wavelength band that tracks the wavelength of the swept local oscillator signal 906. In an embodiment, the diffraction grating is tuned by adjusting the angle of the diffraction grating. The filtered beams that reflect off of the diffraction grating are directed to the four photodetectors 912 for optical detection. A tunable diffraction grating may be utilized in the same fashion in embodiments that include only two beams and two photodetectors.

Referring again to FIG. 7, the four photodetectors 712 are aligned to separately detect the four polarized and filtered beams that are output from the optical pre-selector 714. Each of the four photodetectors generates an electrical signal in response to a corresponding one of the four polarized and filtered beams. The electrical signal generated by each of the four photodetectors is individually provided to the processor 716. The processor 716 receives the electrical signals from the four photodetectors 712 and processes the electrical signals into useful data.

Operation of the optical heterodyne detection system described with reference to FIGS. 7 and 8 involves combining an input signal and a swept local oscillator signal into a combined optical signal and outputting two beams of the combined optical signal from the optical coupler. Each of the two beams containing the combined optical signal is then split into two polarized beams having different polarization states. The polarization states of the extraordinary portions of the split beams are then rotated so that all four beams have the same polarization state. The four beams are then filtered by the optical pre-selector 714. The optical pre-selector passes a wavelength band that tracks the wavelength of the swept local oscillator signal. The passband of the optical pre-selector is tuned in real-time to track the wavelength of the local oscillator signal. The four polarized and filtered beams are then detected by the four photodetectors 712. The four photodetectors generate electrical signals in proportion to the intensity of the optical beams that are detected. The electrical signals generated by the four photodetectors are then received by the processor 716 and processed in a manner that maximizes the signal to noise ratio of the heterodyne term of the combined optical signal. Processing of the electrical signals may involve providing intensity noise suppression and polarization independence.

Figure 10:
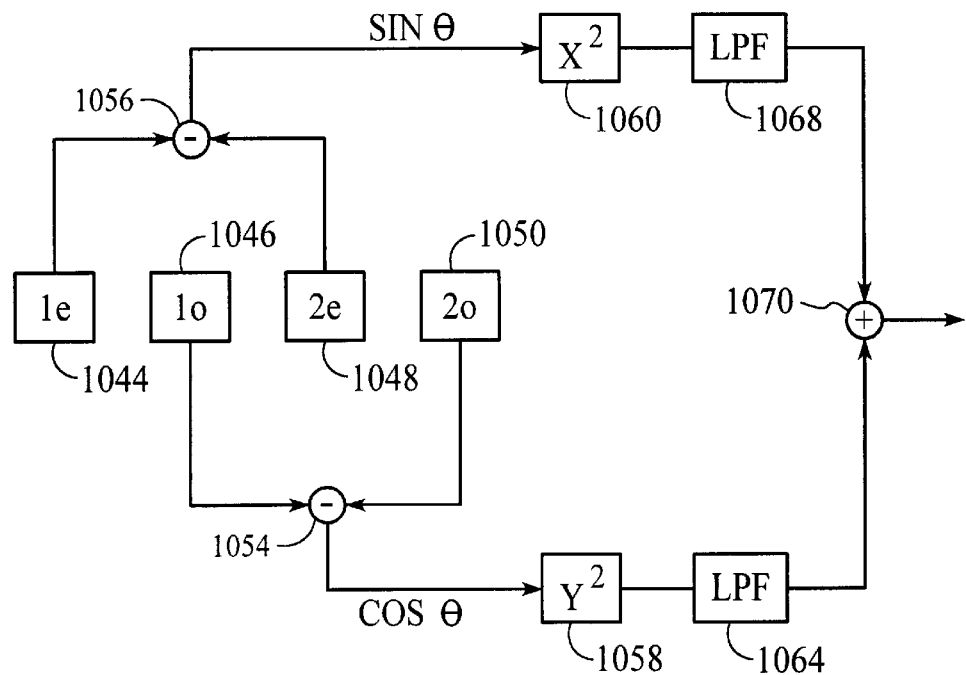
FIG. 10 is a graphical depiction of the signal processing that is performed on the electrical signals that are generated from the system of FIGS. 7 and 8 in accordance with the invention.

FIG. 10 is an example graphical depiction of how the electrical signals generated by a system with four photodetectors are processed to achieve intensity noise suppression and polarization diversity. The signal processing preferably involves digital signal processing although this is not critical. As shown in FIG. 10, the photodetectors 1044 and 1046 are partially identified by "1," which corresponds to the beam (beam 1) that is output from the first output fiber 818 of the optical coupler 820 as shown in FIG. 8. The photodetectors 1048 and 1050 are partially identified by the number "2," which corresponds to the beam (beam 2) that is output from the second output fiber 828 of the optical coupler shown in FIG. 8. The two photodetectors 1046 and 1050 that receive the ordinary portions of the split beams are partially identified by the letter "o," which corresponds to the ordinary beams exiting from the optical combining unit. The two photodetectors 1044 and 1048 that receive the extraordinary portions of the split beams are partially identified by the letter "e," which corresponds to the extraordinary beams exiting from the optical combining unit. Under this convention, the four beams, the respective photodetectors, and the respective electrical signals are identified as "1e," "1o," "2e," and "2o." It should be noted that although the beams are identified as extraordinary and ordinary, in an embodiment, the polarization states of all four beams have been made the same.

Initially, signal subtractions are performed between the "1o" signal and the "2o" signal, and between the "1e" signal and the "2e" signal. The subtraction functions are represented by subtraction units 1054 and 1056, respectively. The subtraction functions are performed to provide intensity noise suppression by canceling out the intensity noise components of the optical signals that are received by each photodetector. The subtraction functions cancel out the intensity noise because the intensity noise is common to each signal. That is, the amplitudes of the "1e" and "2e" signals fluctuate synchronously and by the same percentage relative to each other, and the "1o" and "2o" signals fluctuate synchronously and by the same percentage relative to each other. In the embodiment of FIG. 4 where only one beam is split into two polarized beams, the subtraction functions are not performed.

Additional signal processing is implemented on the subtracted signals to provide polarization diversity. Because the combined optical signal beams are split into orthogonal states of polarization, one of the beams is proportional to $\cos\theta$ and the other beam is proportional to $\sin\theta$, where $\theta$ is the angle of polarization of the input signal. In the example of FIG. 10, the electrical signals generated from the ordinary beam portions include a $\cos\theta$ term and the electrical signals generated from the extraordinary beam portions include a $\sin\theta$ term. The $\cos\theta$ term is squared, as represented by squaring unit 1058, and the $\sin\theta$ term is squared, as represented by squaring unit 1060. The squaring units generate output signals that are proportional to the square of the input signals. In an embodiment, the output signals from the squaring units are each connected to low pass filtering units 1064 and 1068 although the low pass filtering units may not be critical. The low pass filtering units provide low pass filtering on the squared output signals. The output signals from the low pass filtering units are each connected to an input terminal of an adder unit, designated 1070, which produces a readout signal that is proportional to the sum of the signals from the low pass filtering units. Squaring the $\cos\theta$ term and the $\sin\theta$ term, low pass filtering the terms, and then adding the squared and filtered $\cos\theta$ term to the squared and filtered $\sin\theta$ term provides a result that is independent of the angle of polarization ($\theta$) of the input signal and therefore polarization diverse.

In the embodiment described with reference to FIG. 3, the subtraction function is performed to electronically reduce the intensity noise, however the squaring and adding functions are not used. In the embodiment described with reference to FIG. 4, the squaring and adding functions are performed to provide a result that is independent of the angle of polarization of the input signal, however the subtraction function is not used. It should be understood that in a digital system the subtracting, squaring, low pass filtering, and adding units may be incorporated into a multi-function processor.

Referring back to FIG. 7, the combination of the optical combining unit 710, the optical pre-selector 714, the four photodetectors 712, the processor 716, including units 1054, 1056, 1058, 1060, 1064, 1068, and 1070 creates a system that filters optical signals to reduce noise, that is insensitive to the polarization state of the input signal, and that suppresses the intensity noise of the split beams that are detected by the four photodetectors.

Figure 11A:
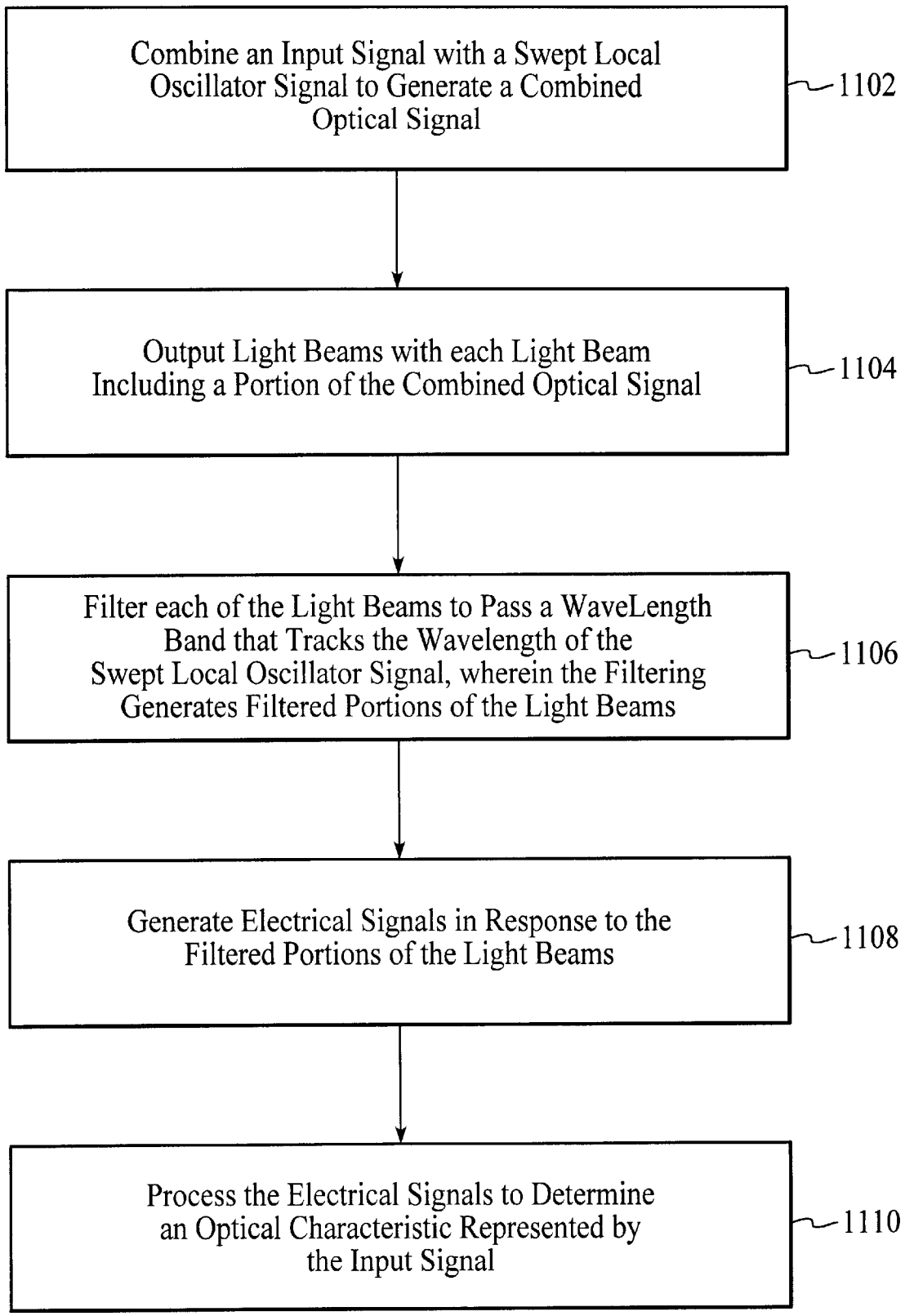
FIG. 11A is a process flow diagram of a method for monitoring an input signal utilizing optical heterodyne detection that includes optical pre-selection.

A method for monitoring an optical signal utilizing an optical heterodyne detection system with optical pre-selection is described herein and depicted in the process flow diagram of FIG. 11A. In a step 1102, an input signal is combined with a swept local oscillator signal to generate a combined optical signal. In a step 1104, light beams are output with each light beam including a portion of the combined optical signal. In a step 1106 each of the light beams is filtered to pass a wavelength band that tracks the wavelength of the swept local oscillator signal, wherein the filtering generates filtered portions of the light beams. In a step 1108, electrical signals are generated in response to the filtered portions of the light beams. In a step 1110, the electrical signals are processed to determine an optical characteristic represented by the input signal.

Figure 11B:
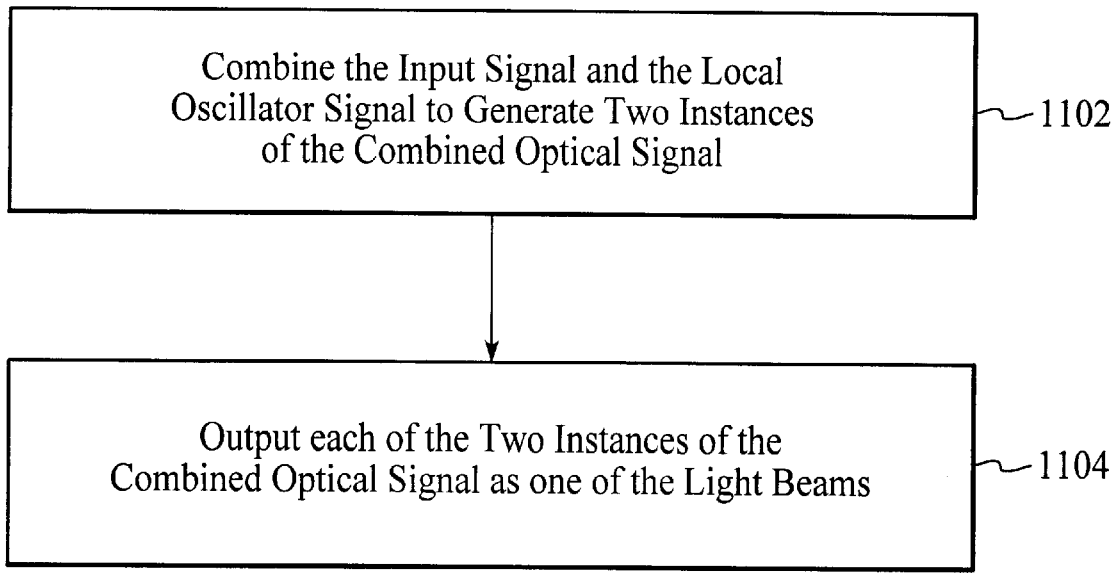
FIG. 11B is a process flow diagram of process steps related to the process flow diagram of FIG. 11A.

An embodiment of the method depicted in FIG. 11A includes details of steps 1102 and 1104. Referring to FIG. 11B, in step 1102 the input signal and the swept local oscillator signal are combined to generate two instances of the combined optical signal and in step 1104 each of the two instances of the combined optical signal is output as one of the light beams.

Figure 11C:
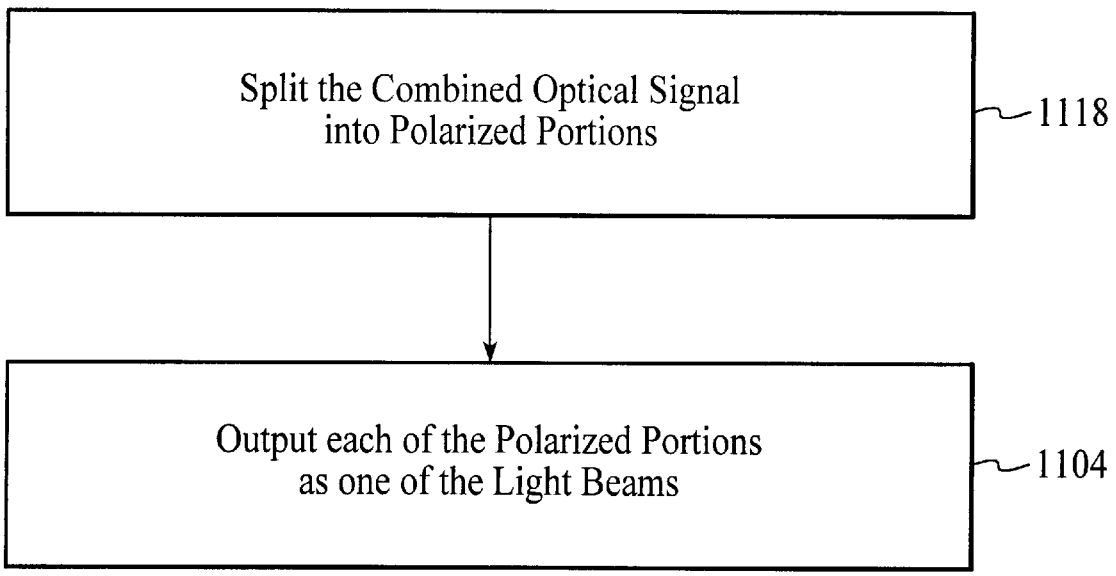
FIG. 11C is a process flow diagram of process steps related to the process flow diagram of FIG. 11A.

Another embodiment of the method depicted in FIG. 11A includes an additional step and details of step 1104. Referring to FIG. 11C, in step 1118 the combined optical signal is split into polarized portions and in step 1104 each of the polarized portions is output as one of the light beams.

Another embodiment of the method depicted in FIG. 11A includes details of steps 1102–1110 and an additional step.

Figure 11D:
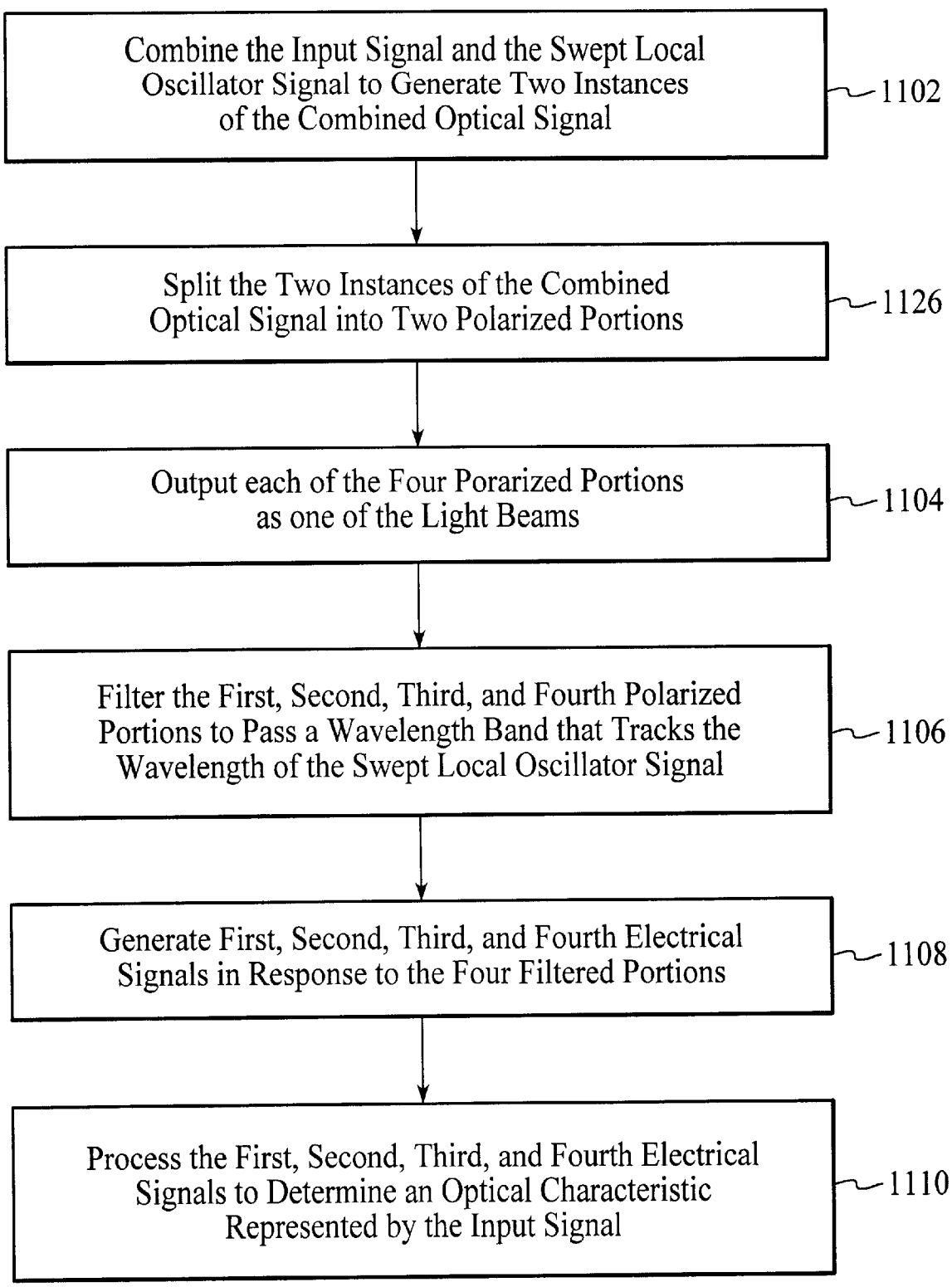
FIG. 11D is a process flow diagram of process steps related to the process flow diagram of FIG. 11A.

Referring to FIG. 11D, in step 1102 the input signal and the swept local oscillator signal are combined to generate two instances of the combined optical signal. In step 1126, the two instances of the combined optical signal are split into two polarized portions. In step 1104, each of the four polarized portions is output as one of the light beams. At step 1106, the first, second, third, and fourth polarized portions are filtered to pass a wavelength band that tracks the wavelength of the swept local oscillator signal. In step 1108, first, second, third, and fourth electrical signals are generated in response to the filtered portions of the first, second, third, and fourth light beams. In a step 1110, the first, second, third, and fourth electrical signals are processed to determine an optical characteristic represented by the input signal.

Figure 12:
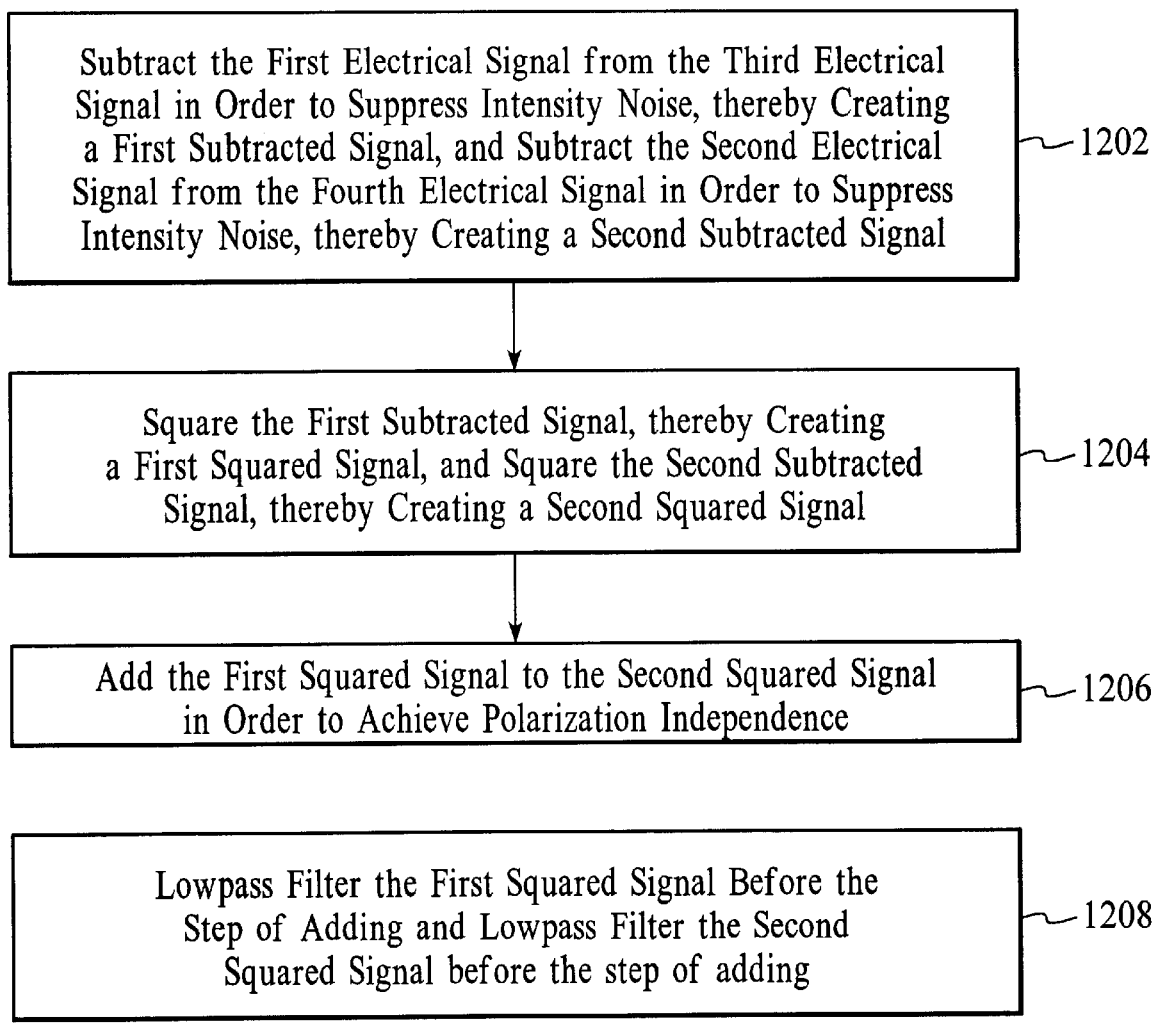
FIG. 12 is a process flow diagram of processing steps related to the process flow diagram of FIG. 11A.

Details of the processing for the method step described in step 1110 of FIG. 11D are represented in FIG. 12. In a step 1202, the processing involves subtracting the first electrical signal from the third electrical signal in order to suppress intensity noise, thereby creating a first subtracted signal, and subtracting the second electrical signal from the fourth electrical signal in order to suppress intensity noise, thereby creating a second subtracted signal. It should be noted that these process steps are not utilized when the combined optical signal is split into only two polarized beams.

In an additional step 1204, the processing further involves squaring the first subtracted signal, thereby creating a first squared signal, and squaring the second subtracted signal, thereby creating a second squared signal.

In an additional step 1206, the processing further involves adding the first squared signal to the second squared signal in order to achieve polarization independence.

In an additional related step 1208, the processing further involves low pass filtering the first squared signal before the step of adding and low pass filtering the second squared signal before the step of adding.

In an embodiment, the filtering of the beams is adjusted in real-time to track the wavelength change of the swept local oscillator signal. In an embodiment, the intensity noise of the input signal is reduced before the input signal is combined with the swept local oscillator signal. In an embodiment, the intensity noise of the swept local oscillator signal is reduced before the swept local oscillator signal is combined with the input signal. In an embodiment, the swept local oscillator signal is amplified before the intensity noise of the swept local oscillator signal is reduced.

An embodiment of an optical heterodyne detection system that is similar to the systems and method that are described with reference to FIGS. 2–12 may include a switch associated with the signal fiber. The switch is utilized to selectively block transmission of the input signal in order to calibrate the system. For example, while the input signal is switched off, the coupling coefficient of the optical combing unit can be determined as a function of wavelength by sweeping the local oscillator signal across a range of wavelengths. In addition, the responsivity of the photodetectors can be determined as a function of wavelength by sweeping the local oscillator signal while the input signal is switched off.

Further, the distribution of the local oscillator signal onto the photodetectors can be determined as a function of wavelength by sweeping the local oscillator signal while the input signal is switched off. It is preferable that the local oscillator signal is approximately evenly distributed among the photodetectors. If the local oscillator signal is not evenly distributed among the photodetectors, then the power distribution of the local oscillator signal may be adjusted utilizing a polarization controller.

Figure 13:
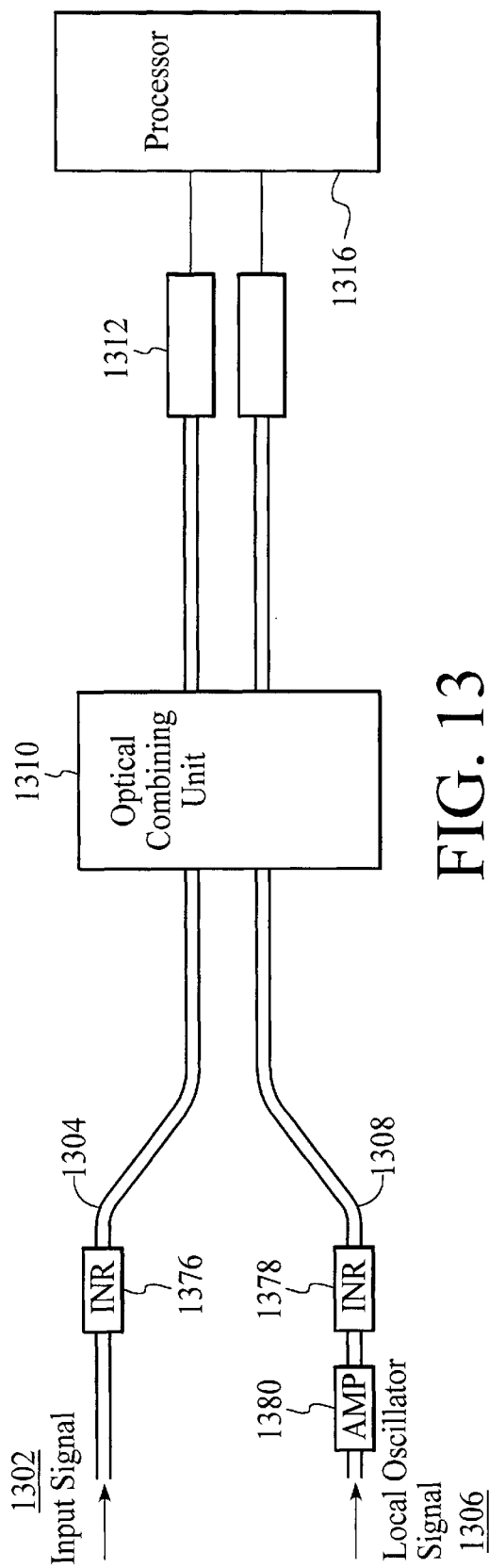
FIG. 13 is a depiction of an optical heterodyne detection system that includes two intensity noise reducers, a local oscillator amplifier, and an optical combining unit in accordance with the invention.

Another embodiment of the invention involves an optical heterodyne detection system in which the intensity noise of the input signal and/or the intensity noise of the swept local oscillator signal is reduced before the input signal and the swept local oscillator signal are combined. An embodiment of the optical heterodyne detection system is depicted in FIG. 13 and includes an input signal 1302, a signal fiber 1304, an intensity noise reducer 1376 on the signal fiber, a local oscillator signal 1306, a local oscillator fiber 1308, an optical amplifier 1380 and an intensity noise reducer 1378 on the local oscillator fiber, an optical combining unit 1310, two photodetectors 1312, and a processor 1316. The system of FIG. 13 does not include an optical pre-selector as described with reference to the system of FIG. 2. Elements shown in FIG. 13 that are similar to elements shown in FIG. 2 are identified by similar element numbers. In addition, the above-provided descriptions apply to similar elements in FIG. 13. Operation of the optical heterodyne detection system of FIG. 13 is also similar to the system of FIG. 2 except that there is no optical pre-selection.

While the embodiment of FIG. 13 includes the two intensity noise reducers 1376 and 1378 and the optical amplifier 1380 on the same system, other embodiments of the optical heterodyne detection system may include any combination of the intensity noise reducers and the optical amplifier. For example, an embodiment of the system may include the intensity noise reducer 1376 on the signal fiber 1304 and no intensity noise reducer on the local oscillator fiber 1308. Conversely, an embodiment may include the intensity noise reducer 1378 on the local oscillator fiber and no intensity noise reducer on the signal fiber. In addition, although the intensity noise reducers are located before the optical combining unit 1310, the intensity noise reducers may be placed in other locations within the optical heterodyne detection system.

As described above, utilizing intensity noise reducers 1376 and 1378 on the input fiber 1304 and/or the local oscillator fiber 1308 reduces the intensity noise that is detected by the photodetectors 1312 and improves the signal to noise ratio and the dynamic range of the heterodyne detection system. Optical intensity noise reduction can be accomplished utilizing various techniques. Example intensity noise reduction systems are described below with reference to FIG. 16–18.

The optical amplifier 1380 on the local oscillator fiber 1308 is utilized to increase the power of the local oscillator signal 1306, thereby improving the signal to noise ratio and dynamic range of the heterodyne detection system. An erbium doped fiber amplifier may be utilized to amplify the local oscillator signal. The intensity noise reducer 1378 on the local oscillator fiber should be utilized when the optical amplifier is utilized in order to control the additional intensity noise that is contributed by the optical amplifier.

Figure 14:
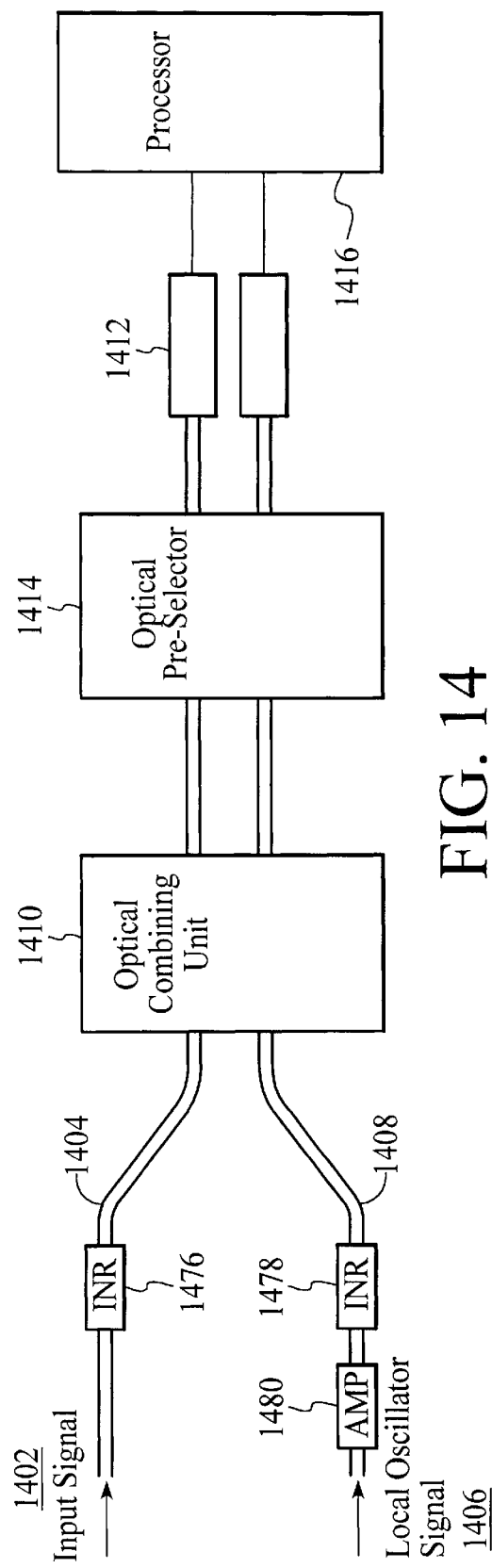
FIG. 14 is a depiction of an optical heterodyne detection system that includes two intensity noise reducers, a local oscillator amplifier, an optical combining unit, and an optical pre-selector in accordance with the invention.

While the embodiment of FIG. 13 includes intensity noise reduction for the input signal 1302 and/or the local oscillator signal 1306, it does not include the optical pre-selector as described above with regard to the optical heterodyne detection system of FIG. 2. An optical pre-selector can be added to the system of FIG. 13 to create the system that is depicted in FIG. 14. The system depicted in FIG. 14 includes an intensity noise reducer 1476 on the input fiber 1404, an intensity noise reducer 1478 and an optical amplifier 1480 on the local oscillator fiber 1408, and an optical pre-selector 1414 located between the optical combining unit 1410 and the photodetectors 1412. The system of FIG. 14 operates similarly to the systems described with reference to FIGS. 2 and 13. Although FIG. 14 includes an optical combining unit and two photodetectors, the system may alternatively include more than two beams exiting the optical combining unit along with corresponding photodetectors.

Although the two intensity noise reducers 1476 and 1478 and the optical amplifier 1480 shown in FIG. 14 are depicted as parts of the same system, it should be understood that any combination of the intensity noise reducers and the optical amplifier may be implemented in a particular system. For example, an embodiment may include only an intensity noise reducer on the input fiber, or only an intensity noise reducer on the local oscillator fiber, or the intensity noise reducer and the optical amplifier on the local oscillator fiber and no intensity noise reducer on the input fiber. In addition, although the intensity noise reducers are located before the optical combining unit 1410, the intensity noise reducers may be placed in other locations within the optical heterodyne detection system.

Utilizing intensity noise reducers 1476 and 1478 on the input fiber 1404 and/or the local oscillator fiber 1408 in conjunction with the optical pre-selector 1414 reduces the intensity noise that is detected by the photodetectors 1412 and improves the signal to noise ratio and the dynamic range of the heterodyne detection system.

Figure 15A:
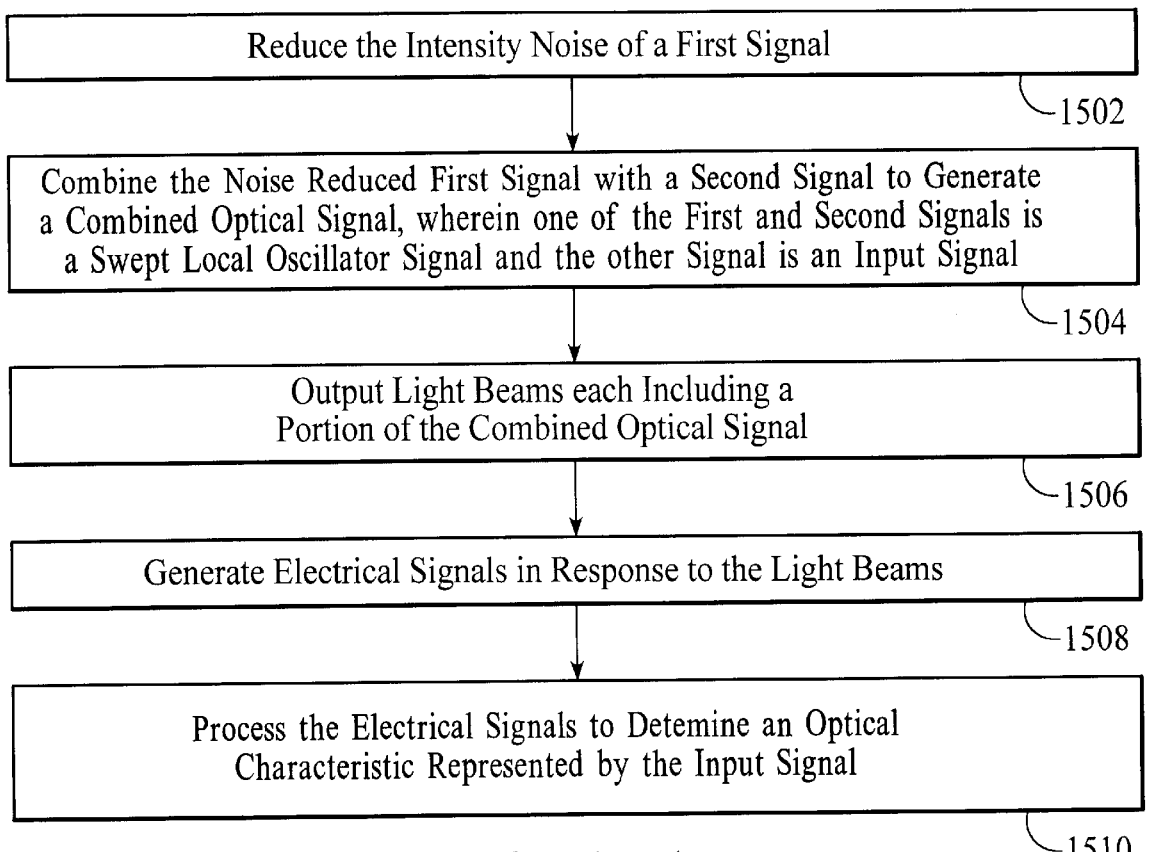
FIG. 15A is a process flow diagram of a method for monitoring an input signal utilizing optical heterodyne detection that includes intensity noise reduction.

A method for monitoring an optical signal utilizing an optical heterodyne detection system with intensity noise reduction is depicted in the process flow diagram of FIG. 15A. In a step 1502, the intensity noise of a first signal is reduced. In a step 1504, the noise reduced first signal is combined with a second signal to generate a combined optical signal. One of the first and second signals is a swept local oscillator signal and the other signal is an input signal. In a step 1506, light beams are output, wherein the light beams each include a portion of the combined optical signal. In a step 1508, electrical signals are generated in response to the light beams. In a step 1510, the electrical signals are processed to determine an optical characteristic represented by the input signal.

Figure 15B:
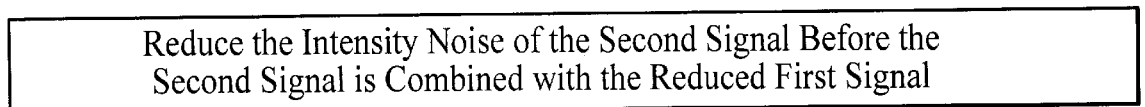
FIG. 15B is a process flow diagram of a process step related to the process flow diagram of FIG. 12A.

An embodiment of the method depicted in FIG. 15A includes an additional step 1514 of reducing the intensity noise of the second signal before the second signal is combined with the reduced first signal as shown in FIG. 15B.

Figure 15C:
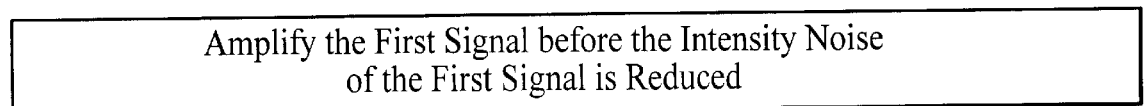
FIG. 15C is a process flow diagram of a process step related to the process flow diagram of FIG. 12A.

An embodiment of the method depicted in FIG. 15A includes an additional step 1516 of amplifying the first signal before the intensity noise of the first signal is reduced as shown in FIG. 15C.

Figure 15D:
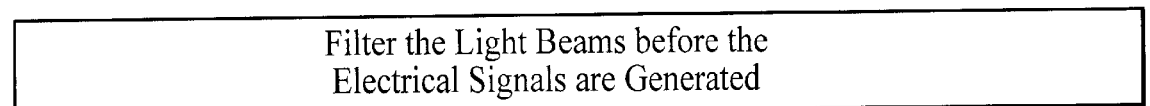
FIG. 15D is a process flow diagram of a process step related to the process flow diagram of FIG. 12A.

An embodiment of the method depicted in FIG. 15A includes an additional step 1518 of filtering the light beams before the electrical signals are generated as shown in FIG. 15D.

An embodiment of the method depicted in FIG. 15A includes details of steps 1504 and 1506. Referring back to FIG. 11B, in step 1114 the input signal and the swept local oscillator signal are combined to generate two instances of the combined optical signal and in step 1116 each of the two instances of the combined optical signal is output as one of the light beams.

Another embodiment of the method depicted in FIG. 15A includes an additional step and details of step 1506. Referring back to FIG. 11C, in step 1118 the combined optical signal is split into polarized portions and in step 1104 each of the polarized portions is output as one of the light beams.

Another embodiment of the method depicted in FIG. 15A includes details of steps 1504 and 1506 and an additional step that are the same as the process steps provided in FIG. 11D except that the polarized light beams are not filtered as recited in step 1106. The above-provided description of the steps in FIG. 11D relates to the process of FIG. 15A and is therefore not repeated.

Details of the processing recited in step 1510 of FIG. 15A are represented in FIG. 12. The above-provided description of the steps in FIG. 12 relates to the process of FIG. 15A and is therefore not repeated.

Figure 16:
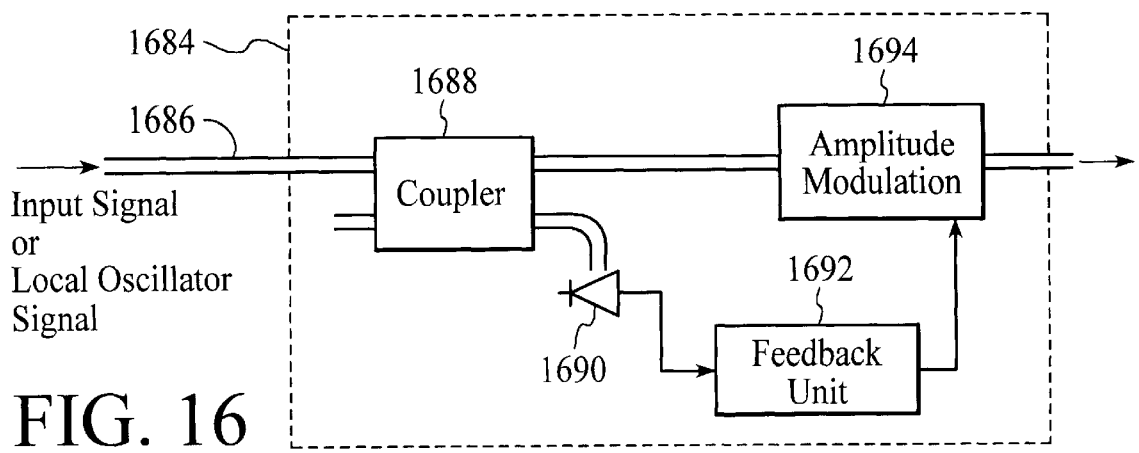
FIG. 16 is a depiction of an example intensity noise reducer that may be utilized with the systems of FIGS. 13 and 14.
Figure 17:
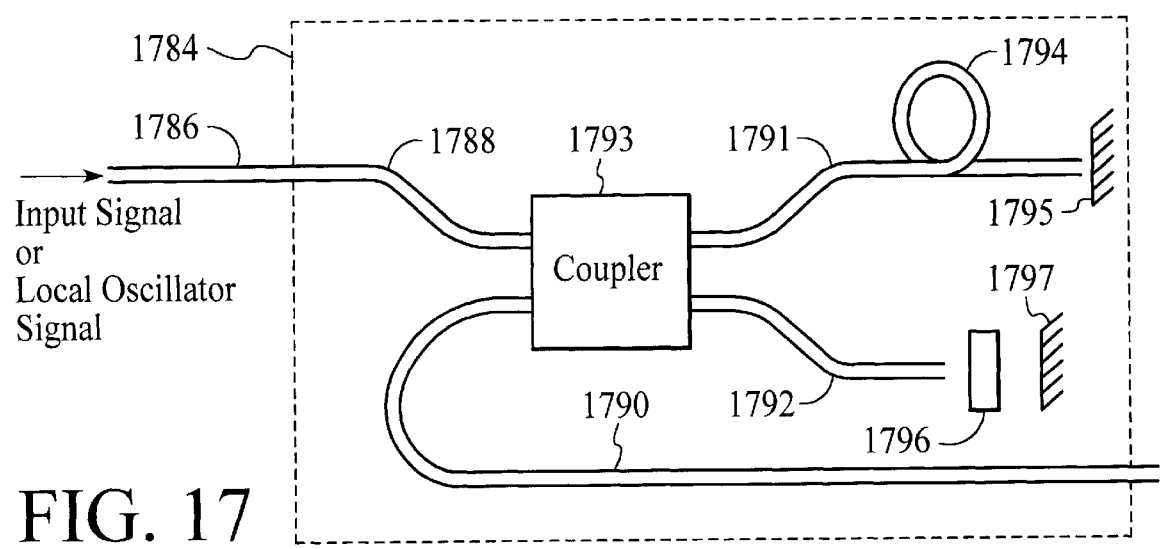
FIG. 17 is a depiction of an example intensity noise reducer that may be utilized with the systems of FIGS. 13 and 14.

Although other intensity noise reducers may be utilized in the systems and methods described with reference to FIGS. 2–15, example embodiments of intensity noise reducers are depicted in FIGS. 16 and 17. The intensity noise reducer 1684 of FIG. 16 can be utilized on the signal fiber and/or the local oscillator fiber 1686. In the example shown, the intensity noise reducer is included in the local oscillator fiber 1686 and the system includes a coupler 1688, a photodetector 1690, a feedback system 1692, and an amplitude modulator 1694. Intensity noise is reduced by sampling the incoming signal to measure the intensity noise and then amplitude modulating the incoming signal to smooth out the intensity noise. The amplitude modulator may include a $LiNbO_3$ modulator, an acousto-optic modulator, an optical semiconductor amplifier, or any other device that can change the transmission of the incoming signal in response to a feedback signal.

The intensity noise reducer 1784 of FIG. 17 can be utilized on the signal fiber and/or the local oscillator fiber 1786. In the example shown, the intensity noise reducer is included in the local oscillator fiber 1786 and the system includes an input fiber 1788, an output fiber 1790, a first delay fiber 1791, a second delay fiber 1792, a coupler 1793, a delay unit 1794, a Faraday mirror 1795, a half-wave plate rotated at 45 degrees 1796, and an ordinary mirror 1797. In an embodiment, the input fiber is polarization maintaining fiber and the incoming signal (either the input signal or the local oscillator signal) is at zero degrees relative to the polarization maintaining fiber. In operation, the Faraday mirror on the first delay fiber and the half-waveplate and mirror on the second delay fiber create two delayed signals that have orthogonal polarizations. When the two delayed signals are combined there is no optical interference, however the intensity noise fluctuations within a predetermined frequency range are combined with 180 degrees of phase difference. Because the intensity noise fluctuations are 180 degrees out of phase, the intensity noise of the two delayed signals cancel out and the resulting signal on the output fiber has reduced intensity noise. The above-described intensity noise reduction technique can be implemented with other arrangements utilizing, for example, regular beam splitters, standard single mode fiber directional couplers, and Faraday mirrors.

Figure 18:
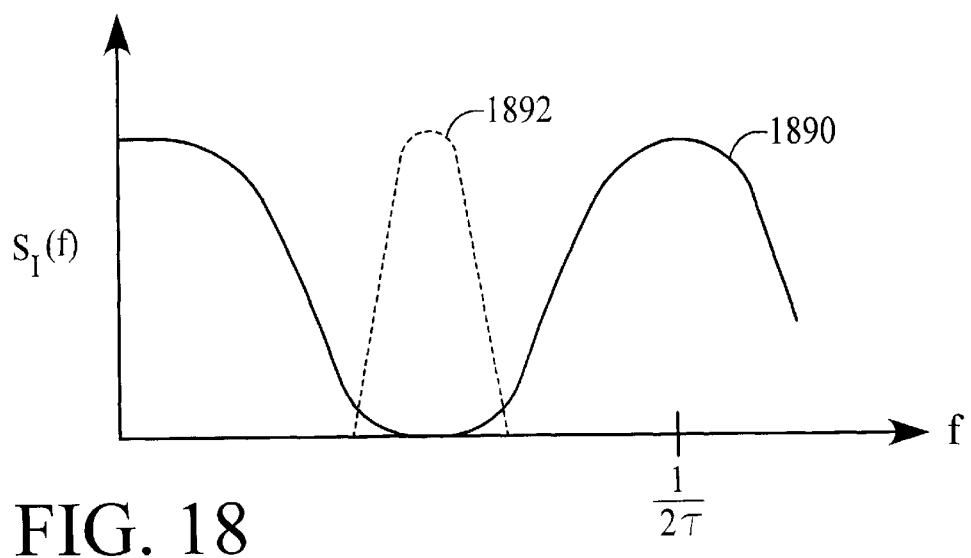
FIG. 18 is a graph of the power spectral density of an input signal vs. frequency after the intensity noise has been reduced by the intensity noise reducer of FIG. 17.

FIG. 18 is a graph of the power spectral density of an input signal vs. frequency after the intensity noise has been reduced utilizing the intensity noise reducer as utilized in FIG. 17. The solid line 1890 represents the filtered intensity noise and the dashed line 1892 represents the location of the heterodyne signal relative to the filtered intensity noise.

What is claimed is:

1. A system for optical heterodyne detection comprising:
   an intensity noise reducer for reducing the intensity noise of a first signal;
   an optical combining means for combining said noise reduced first signal and a second signal into a combined optical signal and for outputting light beams each including a portion of said combined optical signal, one of said first and second signals being a swept local oscillator signal; and photodetectors each optically arranged to receive a different one of said light beams, said photodetectors generating electrical signals in response to respective ones of said light beams.

2. The system of claim 1 further including an intensity noise reducer for reducing the intensity noise of said second signal.

3. The system of claim 1 further including an amplifier located in an optical path before said intensity noise reducer of said first signal.

4. The system of claim 1 further including an optical pre-selector optically connected to receive said light beams from said optical combining means, said optical pre-selector having a passband that tracks the wavelength of said swept local oscillator signal, said optical pre-selector outputting filtered portions of said light beams to said photodetectors.

5. The system of claim 1 further including a processor, arranged to receive said electrical signals, for generating an output signal that is substantially independent of the polarization of said first and second signals.

6. The system of claim 1, in which said optical combining means includes an optical combining unit arranged to receive said first signal and said second signal, said optical combining unit operating to generate said combined optical signal in two optical paths and to output said combined optical signal in each of said optical paths as one of said light beams.

7. The system of claim 1, in which said optical combining means includes:
    an optical combining unit arranged to receive said first signal and said second signal, said optical combining unit operating to generate said combined optical signal; and
    a polarizing beam splitter arranged to receive said combined optical signal and operating to split said combined optical signal into two polarized portions and to output each of said two polarized portions as one of said light beams.

8. The system of claim 7 further including a half-wave plate for shifting the polarization state of one of said two polarized portions, said half-wave plate being located between said polarizing beam splitter and said photodetectors.

9. The system of claim 1, in which said optical combining means includes:
    an optical combining unit arranged to receive said first signal and said second signal, said optical combining unit operating to generate said combined optical signal in two optical paths; and
    a polarizing beam splitter arranged to receive said combined optical signal from each of said two optical paths and operating to split said combined optical signal in each of said two optical paths into two polarized portions and to output each of said polarized portions as one of said light beams.

10. The system of claim 9 further including two half-wave plates for shifting the polarization states of two of said polarized portions, said two half-wave plates being located between said polarizing beam splitter and said photodetectors.

11. A method for monitoring an optical signal utilizing optical heterodyne detection comprising steps of:
    reducing the intensity noise of a first signal;
    combining said noise reduced first signal with a second signal to generate a combined optical signal, one of said first and second signals being a swept local oscillator signal and the other signal being an input signal;
    outputting light beams each including a portion of said combined optical signal;
    generating electrical signals in response to said light beams; and
    processing said electrical signals to determine an optical characteristic represented by said input signal.

12. The method of claim 11 further including a step of reducing the intensity noise of said second signal before said second signal is combined with said noise reduced first signal.

13. The method of claim 11 further including a step of amplifying said first signal before said step of reducing the intensity noise of said first signal.

14. The method of claim 11 further including a step of, before said electrical signals are generated, filtering said light beams to pass a wavelength band that tracks the wavelength of said swept local oscillator signal.

15. The method of claim 11, in which:
    in combining said input signal with said swept local oscillator signal, said input signal is combined with said swept local oscillator signal to generate two instances of said combined optical signal; and
    in outputting said light beams, each of said two instances of said combined optical signal is output as one of said light beams.

16. The method of claim 11, in which:
    the method additionally comprises splitting said combined optical signal into polarized portions; and
    in outputting said light beams, each of said polarized portions is output as one of said light beams.

17. The method of claim 16 further including a step of, before said electrical signals are generated, filtering said polarized portions to pass a wavelength band that tracks the wavelength of said swept local oscillator signal.

18. The method of claim 17 further including a step of rotating the polarization state of one of said polarized portions to match the other polarized portions.

19. The method of claim 16, in which said step of processing includes steps of:
    squaring a first one of said electrical signals, thereby creating a first squared signal;
    squaring a second on of said electrical signals, thereby creating a second squared signal; and
    adding said first squared signal to said second squared signal to achieve polarization independence.

20. The method of claim 11, in which:
    in combining said input signal with said swept local oscillator signal, said input signal is combined with said swept local oscillator signal to generate two instances of said combined optical signal;
    the method additionally comprises splitting each of said two instances of said combined optical signal into two polarized portions to generate four polarized portions of said combined optical signal; and
    in outputting said light beams, each of said four polarized portions is output as one of said light beams.

21. The method of claim 20 wherein said step of processing said electrical signals includes steps of:

subtracting a first electrical signal from a third electrical signal to electronically suppress intensity noise, thereby creating a first subtracted signal;

subtracting a second electrical signal from a fourth electrical signal to electronically suppress intensity noise, thereby creating a second subtracted signal;

squaring said first subtracted signal, thereby creating a first squared signal;

squaring said second subtracted signal, thereby creating a second squared signal; and adding said first squared signal to said second squared signal in order to achieve polarization independence.

22. The method of claim 21 further including the steps of:

low pass filtering said first squared signal before said step of adding; and low pass filtering said second squared signal before said step of adding.

\* \* \* \* \*